Patented Mar. 27, 1923.

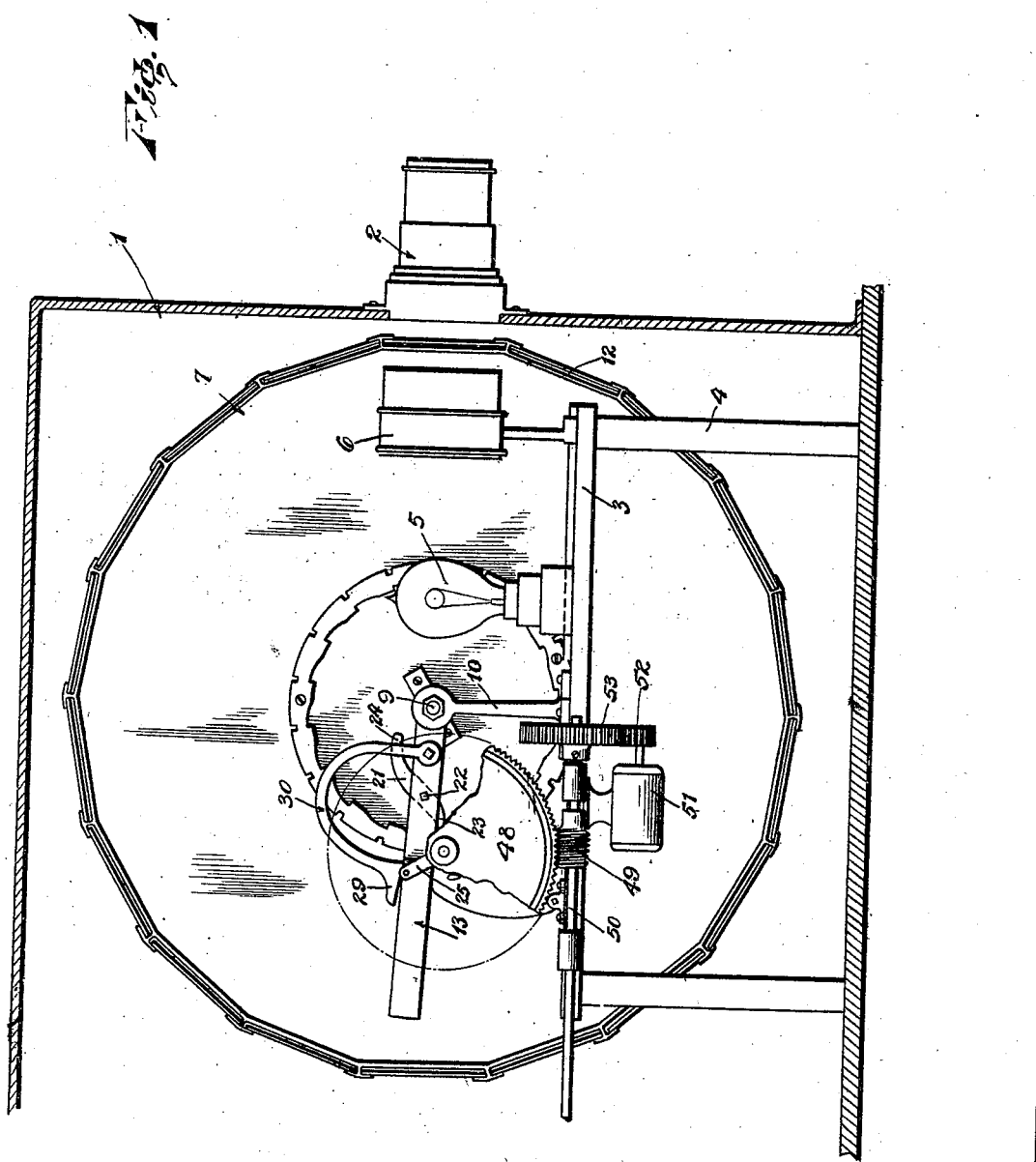

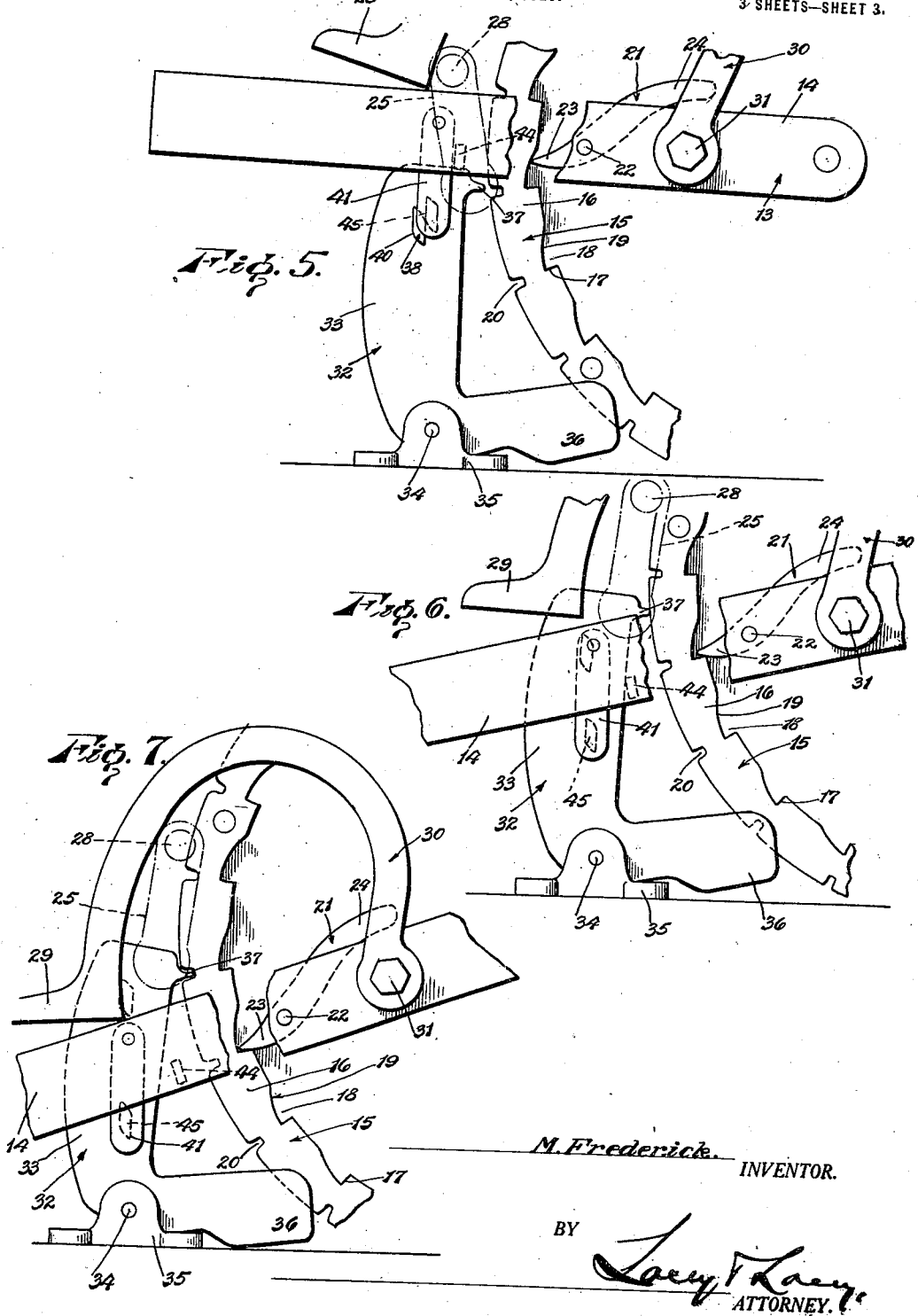

1,449,663

UNITED STATES PATENT OFFICE.

MABEL FREDERICK, OF PUEBLO, COLORADO, ASSIGNOR TO AUTOMATIC ADVERTISING COMPANY, OF PUEBLO, COLORADO, A COPARTNERSHIP.

PROJECTION APPARATUS.

Application filed October 28, 1920. Serial No. 420,209.

*To all whom it may concern:*

Be it known that I, MABEL FREDERICK, a citizen of the United States, residing at Pueblo, in the county of Pueblo and State of Colorado, have invented certain new and useful Improvements in Projection Apparatus, of which the following is a specification.

This invention relates to projection apparatus and more particularly to an apparatus for successively projecting a number of different views, advertisements or the like onto a screen and the object of the invention is generally to provide an apparatus which will operate automatically to successively bring the different views or the like to be projected into position for projection, permitting each to remain stationary for a predetermined period of time to provide for a like period of projection upon the screen. The apparatus is especially adapted for the display of a number of advertisements, as for example during intermission in a motion picture theatre, although it may equally as well be employed in the projection of scenic views, or views of a scientific or technical character.

Another object of the invention is to provide an apparatus for the purpose stated which will be entirely automatic in its operation and will not therefore require the attention of an operator after being once set in motion, except of course to stop the operation when all of the slides or the like which have been placed in the apparatus have been projected or displayed.

Another object of the invention is to provide an apparatus which by a slight modification may be adapted to display any desired number of slides or the like.

In the accompanying drawings:

Figure 1 is a view in side elevation of the apparatus embodying the present invention, the casing or housing being shown in section;

Figure 2 is a top plan view of the apparatus, the slide carrier being shown in section;

Figure 3 is a rear elevation of the apparatus;

Figure 4 is a detail side elevation illustrating the mechanism provided for shifting the slide carrier, the parts being illustrated in the positions which they assume while one of the slides is being projected and immediately before the slide carrier is shifted for the projection of the next slide in order;

Figure 5 is a view similar to Figure 4 illustrating the positions of the parts substantially at the moment of release of the actuating member to shift the slide carrier;

Figure 6 is a view similar to Figure 5 but illustrating the positions of the parts when the actuating member has moved somewhat beyond the position shown in Figure 5;

Figure 7 is a view similar to Figure 6 illustrating the positions of the parts when the actuating member reaches the limit of its downward movement;

Figure 8 is a perspective view illustrating the trip member of the mechanism.

The apparatus embodying the invention is preferably mounted within a lamp house or casing which is indicated in general by the numeral 1 and upon the forward wall of which is arranged a standard type of projecting lens set 2. The numeral 3 indicates a base mounted upon any suitable supporting frame structure 4 within the casing 1, and arranged upon this base is any suitable source of light as for example an incandescent bulb 5. The numeral 6 indicates condensing lenses which are interposed between the source of light 5 and the projecting lens set 2.

The slide carrier of the mechanism is indicated in general by the numeral 7 and the same comprises a rotary drum having a single head 8 which is fixed upon one end of a shaft 9 rotatably mounted in a bearing 10 upon the base 3. An annular series of slide carriers 11 is arranged upon one side of the head 8 of the drum 7 and these carriers are closed at their inner ends by the face of the said head but are open at their outer ends for the introduction of the slides which are indicated by the numeral 12. These carriers may be of any desired construction and any number may be provided within the limits of the diameter of the head of the drum, and inasmuch as the shaft 9 is positioned in a line intersecting the axes of the projecting and condensing lenses 2 and 6, the slides 12 within the carriers 11 will, in the rotation of the drum, be brought successively into perpendicular position between the projecting and condensing lens set in the manner most clearly shown in Figure 1 of the drawings, in which position they will be in the path of the light rays passing between the two lens sets.

The invention contemplates the provision of means for imparting intermittent rotary motion to the slide carrier drum at predetermined intervals of time so as to successively bring the slides carried by the drum into position for projection and maintain each slide stationary in such position for a predetermined period of time, and briefly stated the mechanism provided for this purpose comprises an actuating member which is influenced by gravity to move to a lowered position and which coacts with a ratchet member upon the drum, means being provided for intermittently elevating this member and releasing the same, and a detent means being provided for holding the drum stationary except when moved through the fall of the actuating member through gravity. The actuating member is indicated in general by the numeral 13 and the same comprises an arm 14 which is pivotally mounted at one end upon the shaft 9 so as to have free swinging movement in a vertical plane. The ratchet above referred to is indicated in general by the numeral 15 and the same comprises an annulus 16 provided upon its inner periphery with a series of shoulders 17 each constituting one wall of a notch 18, the bottom wall 19 of which notch is suitably obliquely disposed to the shoulder 17. The annulus 16 is formed in its outer periphery with a series of notches 20 each located directly radially opposite a respective one of the shoulders 17, the annulus 16 being concentric to the shaft 9 and secured in any suitable manner upon the inwardly presented face of the head 8 of the slide carrier drum 7. A pawl 21 is pivoted as at 22 upon the arm 13 and has a toothed end 23 designed to coact with the inner periphery of the ratchet 15. The toothed end 23 of the pawl 21 lies at one side of the pivot 22, and that portion of the pawl which is located at the opposite side of the pivot and which is indicated by the numeral 24, is of sufficient mass to overbalance the toothed end of the pawl so that the latter end of the pawl is at all times held in engagement with the inner periphery of the annulus comprising the ratchet 15. At this point it will be evident that inasmuch as the actuating arm 14 is freely pivoted, when this arm is swung upwardly the toothed end of the pawl 21 will be caused to ride over the inner periphery of the ratchet 15 until it engages the said periphery at a point above one of the shoulders 17, and then if the arm is released, it will fall by gravity, and the coaction of the toothed end 23 of the pawl with the shoulder of the ratchet will cause the drum 7 to be carried around with the said arm 14 as the arm swings downwardly through gravity.

The means provided for intermittently elevating and releasing the actuating arm preferably comprises a crank member 25 which is fixed upon a rotary shaft 26 mounted in suitable bearings 27 upon the base 3, the crank member 25 including a cross pin 28 which is designed to ride beneath and in contact with the free end 29 of a finger 30 which is carried by the arm 14. This finger 30 is of arcuate form and is bolted or otherwise secured, as at 31, to the said arm 14 at its end opposite its end 29, the finger extending, from its secured end, upwardly and rearwardly above the arm 14 with its said end portion 29 located in the path of movement of the cross pin 28 of the crank member 25 in the rotation of this member. Thus as the crank member is rotated through rotation of the shaft 26, the cross pin 28 will travel in a circular path and in this upward and forward travel will ride beneath the end 29 of the finger 30 thus elevating the finger and carrying with it the actuating arm 14 until the arm has been brought to a predetermined position of elevation whereupon the cross pin 28 will ride from beneath the end 29 of the said finger 30 thus allowing the finger and arm to drop by gravity and effect rotation of the slide carrier drum in the manner previously stated. As the finger 30 is of arcuate form, the crank member 25 may continue its rotary motion, in the lowered position of the actuating arm 14 and finger 30 without interfering with or effecting any movement of these parts until the crank member again begins its upward travel.

In order to arrest the rotary motion of the drum at the proper point to position one of the slides in the path of light rays passing from the condensing lenses to the projecting lens set and to hold the slide carrier drum stationary for a predetermined period of time, a detent, indicated in general by the numeral 32, is provided. This detent comprises an upwardly extending arm 33 pivoted at its lower end as at 34 upon a suitable bearing bracket 35 upon the base 3, the arm being provided at its lower end with a forward weighted extension 36 which normally urges the arm in a forward direction upon its pivot so that a tooth 37 provided at the upper end of the rim will at all times coact with the outer periphery of the ratchet 15 and will seat in the notches 20 as these notches are brought to position opposite the said tooth. The numeral 38 indicates in general a cam lug which is formed or provided upon the side of the arm 32 which is presented toward the plane of the arm 13 and this lug has its forward side at its upper end rounded and curved rearwardly as at 39 and its rear side at its lower end curved forwardly as at 40. A trip member is provided for coaction with the cam lug 38 and is indicated in general by the numeral 41 and this trip member comprises a link 42 pivotally suspended, as at 43, from the arm 14 of the actuating member 13 and arranged to rest by gravity against a stop shoulder or lug 44 upon the said arm 14. The lower portion of the link 42 depends beside the face of the arm 33 which carries the cam lug 38 and the adjacent face of the said link 42 is formed or provided with a cam lug 45 which has upper and lower cam surfaces 46 and 47 curved in directions corresponding to the directions of curvature of the cam portions 39 and 40 respectively.

Referring now to Figure 4 of the drawings, it will be observed that the crank member 25, in the position of the parts shown in this figure, has been rotated to such position that the pin 28 is approaching the limit of its upward travel. In traveling upwardly the pin has carried with it the finger 30 and consequently the actuating arm 14 upon which this finger is secured, and in the upward movement of the arm the tooth 23 of the pawl 21 has been caused to ride upwardly over the inner periphery of the ratchet 15 until it engages against the wall 19 of one of the notches 18 above the shoulder 17. In this position of the parts the cam lug 45 of the trip member 41 is located immediately above the cam lug 38 upon the detent 32, the surface 47 of the lug 45 being presented toward the surface 39 of the cam lug 38. As the crank member 25 continues to rotate in a clockwise direction in Figure 4, the pin 28 will finally pass from beneath the end 29 of the finger 30 and at this moment the actuating arm 14 will be released for downward swinging movement through gravity. At this time the distance between the opposing cam surfaces of the lugs 45 and 38 is considerably less than the distance between the point of location of the tooth 23 of the pawl 21 upon the inner periphery of the ratchet 15 and the shoulder 17 and therefore as the actuating arm swings downwardly through gravity, the surface 47 of the cam lug 45 will ride against the surface 39 of the lug 38 and inasmuch as pivotal movement of the detent 41 is limited by its engagement with the stop shoulder 44, the detent 32 will be rocked upon its pivot so as to swing the arm 33 rearwardly and bring the tooth 37 out of engagement with the notch, thus releasing the slide carrier drum for rotary motion. This operation is clearly illustrated in Figure 5 of the drawings, and by reference to Figure 6 it will be noted that upon further downward swinging movement of the actuating arm, the tooth 23 of the pawl 21 will be brought into engagement with one of the shoulders 17 upon the ratchet 15 thereby connecting the drum with the actuating arm so that the downward fall of the arm will result in the drum being rotated through a corresponding arc. In the meantime the lug 45 has moved past and clear of the lug 38 so that the detent 32 is released for return movement to normal position with the tooth 37 engaging the outer periphery of the ratchet 15, and when the slide carrier drum has been rotated to position to bring the next successive notch 20 opposite the said tooth, the tooth will drop into this notch and thus the rotary motion of the drum will be arrested and the drum will be held stationary until the detent is again moved to inactive position. This position of the parts is best shown in Figure 7 of the drawings.

With the parts in the position shown in Figure 7, it will be observed that the lug 45 is directly beneath the lug 38 on a perpendicular line, the cam surface 46 of the lug 45 opposing the cam surface 40 of the lug 38. Therefore as the actuating arm 14 is again swung upwardly through the upward travel of the crank member 25, the cam surfaces of the two lugs will be brought into engagement and the surface 46 will ride past the surface 40, resulting in the detent 41 being swung rearwardly upon its pivot until this lug 45 freely passes the lug 38. Thus in the upward movement of the actuating arm, the trip member is returned to normal position without effecting any movement of the detent member 32 and this member therefore continues to maintain the slide carrier drum stationary until such time as the cross pin 28 of the crank member 25 again rides from beneath the end 29 of the finger 30, whereupon the operation previously described is automatically repeated.

Any means desired may be employed for the purpose of imparting rotary motion to the shaft 26. For example a worm gear 48 may be fixed upon the said shaft and may mesh with a worm 49 upon a shaft 50 driven in any suitable manner as for example by an electric motor 51 and gears 52 and 53, the former being fixed upon the motor shaft and the latter upon the worm shaft 50.

Having thus described the invention, what is claimed as new is:

1. In projection apparatus, a rotary slide carrier, an actuating means influenced to move in one direction and coacting with the carrier to advance the same upon such movement, means operable to intermittently move the actuating means in another direction and release the same, a detent for coaction with the carrier and normally influenced to move to active position, and trip means actuated through movement of the actuating member in the first mentioned direction for rendering the detent inactive.

2. In projection apparatus, a rotary slide carrier, an actuating member mounted for swinging movement and influenced by gravity to swing downwardly, a ratchet associated with the slide carrier, a pawl carried by the actuating member and coacting with the ratchet, means operating intermittently to swing the actuating member in a upward direction and release the same, a detent normally coacting with the ratchet to restrain the slide carrier against movement, a trip member pivotally suspended upon the actuating member, means limiting the pivotal movement of the trip member in one direction, and coacting means upon the trip member and detent for rendering the detent inactive upon downward movement of the trip member with the actuating member, the said coacting means permitting upward movement of the trip member with the actuating member without effecting movement of the detent.

3. In projection apparatus, a rotary slide carrier, an actuating member mounted for swinging movement and influenced by gravity to swing downwardly, a ratchet associated with the slide carrier, a pawl carried by the actuating member and coacting with the ratchet, means operating intermittently to swing the actuating member in an upward direction and release the same, a detent resting by gravity in engagement with the ratchet to retain the slide carrier against movement, a trip member pivotally suspended from the actuating member, an abutment upon the actuating member limiting the swinging movement of the trip member in one direction and coacting cam lugs upon the opposing faces of the trip member and detent, the lug upon the detent being located in the path of movement of the lug upon the trip member in the downward swinging movement of the actuating member whereby to effect disengagement of the detent from the ratchet upon initial downward movement of said member, the cam upon the trip member having a surface for coaction with the cam lug upon the detent to effect a free swinging of the trip member and a free passage of the lug thereon past the lug on the detent in the upward return swinging movement of the actuating member without effecting movement of the detent.

In testimony whereof I affix my signature.

MABEL FREDERICK. [L. S.]